United States Patent [19]
Gothe et al.

[11] Patent Number: 6,049,577
[45] Date of Patent: Apr. 11, 2000

[54] HEADER SYNCHRONIZATION DETECTOR

[75] Inventors: Marlo Rene Gothe, Vancouver, Canada; Claudio Gustavo Rey, Morgan Hill, Calif.

[73] Assignee: Glenayre Electronics, Inc., Charlotte, N.C.

[21] Appl. No.: 09/086,794

[22] Filed: May 28, 1998

[51] Int. Cl.$^7$ .................................. H04L 7/00; H04J 3/06
[52] U.S. Cl. ............................................. 375/368; 370/514
[58] Field of Search ...................................... 375/363, 365, 375/366, 368; 370/509, 511, 512, 514, 350

[56] References Cited

U.S. PATENT DOCUMENTS

| | | | |
|---|---|---|---|
| 5,005,189 | 4/1991 | Hackett, Jr. .............................. | 375/348 |
| 5,329,558 | 7/1994 | Larson et al. ............................ | 375/365 |
| 5,517,524 | 5/1996 | Sato ....................................... | 375/230 |

*Primary Examiner*—Stephen Chin
*Assistant Examiner*—Albert Park
*Attorney, Agent, or Firm*—Christensen O'Connor Johnson & Kindness PLLC

[57] ABSTRACT

A pattern detector adapted for wireless communication systems includes an error calculator, a comb filter, an averager, and a threshold detector. The pattern to be detected is a sequence of pilot signal patterns whose error calculation is relatively invariant with respect to frequency offset introduced by Doppler and the local oscillator. The pattern detector processes received input samples $\bar{y}_k$ to determine an error signal from the input samples $\bar{y}_k$ and estimated input samples $\hat{y}_k$. The estimated input samples $\hat{y}_k$ are determined using an estimated channel impulse response. When a vector of the received input samples is "aligned" with the expected header sync input samples, the level of the error signal is about equal to the level of the noise. The pattern detector determines the average level of the error signals for the last K error signals of each sample position $E_{K_n}$ within a pilot pattern, where K corresponds to the number of pilot patterns in a header sync pattern and n corresponds to the sample position. The pattern detector also determines the average level of the error signals $E_L$ corresponding to the last L received input samples, where L corresponds to the number of samples in a header sync sequence. When $E_{K_n}$ for a sample position is lower than a preselected threshold percentage of $E_L$, the header sync pattern is deemed detected. Finally, the end of the header sync pattern is determined by the location of the minimum $E_{K_n}$. This minimum is found by calculating, once the header is deemed detected, values for $E_{K_n}$ that are a certain number of samples past the last minimum.

35 Claims, 5 Drawing Sheets

HEADER SYNCHRONIZATION DETECTOR

FIELD OF THE INVENTION

The present invention relates to communication systems and, more particularly, to protocol detectors for use in digital communication systems.

BACKGROUND INFORMATION

Digital communication systems typically organize transmissions into blocks of symbols, according to a preselected protocol. A transmitter is used to transmit the blocks in a predetermined frequency band or channel to a receiver. However, the channel may have transmissions according to more than one protocol. The receiver must then monitor the channel for transmissions according to the proper protocol to receive and process a block. FIG. 1 is a simplified functional block diagram of such a digital communication system 10. Although not shown for clarity, as is well known, receiver 14 also includes filters, an analog-to-digital converter, demodulator, etc. In exemplary system 10, a transmitter 12 is capable of transmitting blocks according to several different protocols, including protocols P1, P2, and P3. In this example, all three of the protocols may be transmitted in a single channel at different times.

FIG. 2 shows a sequence of blocks transmitted according to different protocols in a single channel. As a result, a receiver 14 monitoring the channel will receive blocks according to all three protocols. However, in some communication systems, the receiver can process transmissions according to only one protocol. For example, in a paging system, the pagers carried by the users generally can process pages according to only a single protocol (e.g., POCSAG). In this example, receiver 14 includes a protocol detector 16 to determine if a detected transmission conforms to the receiver's protocol. Some conventional protocol detectors use correlation techniques to identify the block's protocol.

More specifically, as shown in FIG. 2, each block has a synchronization segment or header synchronization (header sync) pattern. Protocol detector 16 then correlates the header sync pattern of its protocol continuously to the received signal, as indicated by correlator 18. For example, in a transmission according to protocol $P_1$, the transmitted block includes a synchronization or header sync portion $S_1$ followed by a data portion $D_1$. Header sync portion $S_1$ typically includes a preselected sequence or pattern of symbols that are unique to protocol $P_1$. Similarly, in a transmission according to protocol $P_2$, the transmitted block has a unique header sync portion $S_2$ and a data portion $D_2$, and so on. When the received signal contains a header sync pattern that aligns with the correlator according to the receiver's protocol, the correlation output signal level is relatively high. Thus, a high level of the correlation output signal is indicative of a matching header sync. However, this type of protocol detector is susceptible to signal-to-noise (SNR) problems caused by a frequency offset in the local oscillator (LO) of the receiver. If a longer sync pattern is used to overcome the degraded SNR caused by the frequency offset of the LO, the detection process becomes more susceptible to signal changes due to fading. Also, the correlation output is degraded by the filtering of the signal by the channel impulse response. Accordingly, there is a need for a protocol detector that is relatively insensitive to frequency offsets, low SNR, and channel impairments such as multipath fading.

SUMMARY

In accordance with the present invention, a pattern detector is provided. In one embodiment adapted for wireless communication systems, the pattern detector includes an error calculator, a comb filter, an averager, and a threshold detector. The pattern to be detected is a sequence of pilot signal patterns (pilot patterns) whose detection is invariant with respect to Doppler and LO frequency offsets. The pattern detector processes received input samples $y_k$ to determine an error signal from a vector of input samples $\bar{y}_k$ and estimated input samples $\hat{y}_k$ (i.e., the estimated input samples generated when the desired sequence is transmitted and received). In one aspect of the present invention, the estimated input samples $\hat{y}_k$ are computed using an estimated channel impulse response.

When a vector of the received input samples $\bar{y}_k$ is "aligned" with the expected header sync input samples, the level of the error signal is about equal to the level of the noise. The pattern detector then determines the average level of the error signals for the last K error signals of each sample position $E_{Kn}$ within a pilot pattern, where K corresponds to the number of pilot patterns in a header sync pattern and n corresponds to the sample position. In addition, the pattern detector also determines the average level of the error signals $E_L$ corresponding to the last L received input samples, where L corresponds to the number of samples in a header sync sequence. In accordance with the present invention, the desired pattern is detected by comparing $E_{Kn}$ to $E_L$ for each sample position. When $E_{Kn}$ for a sample position is lower than a preselected threshold percentage of $E_L$, the header sync pattern is deemed detected. Because of the particular property of the pilot sequences used in the present invention, the pattern detector is relatively insensitive to frequency offsets. In addition, the averaging of error signals over the repeated pilot sequence advantageously decreases sensitivity of the pattern detector to noise and fading.

BRIEF DESCRIPTION OF THE DRAWINGS

The foregoing aspects and many of the attendant advantages of this invention will become more readily appreciated by reference to the following detailed description, when taken in conjunction with the accompanying drawings.

DETAILED DESCRIPTION

Figure 1:
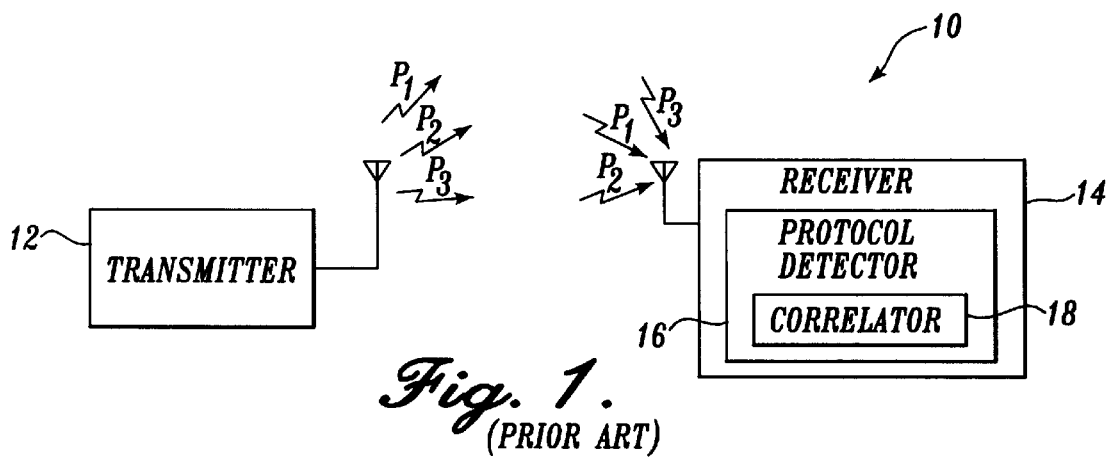
FIG. 1 is a simplified functional block diagram illustrative of a conventional digital communication system.
Figure 2:
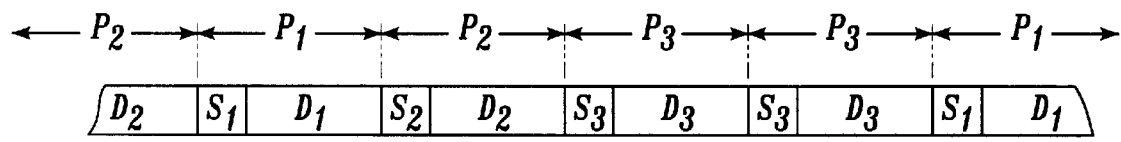
FIG. 2 is a diagram illustrative of a sequence of transmitted protocols on a single channel with different protocols.
Figure 3:
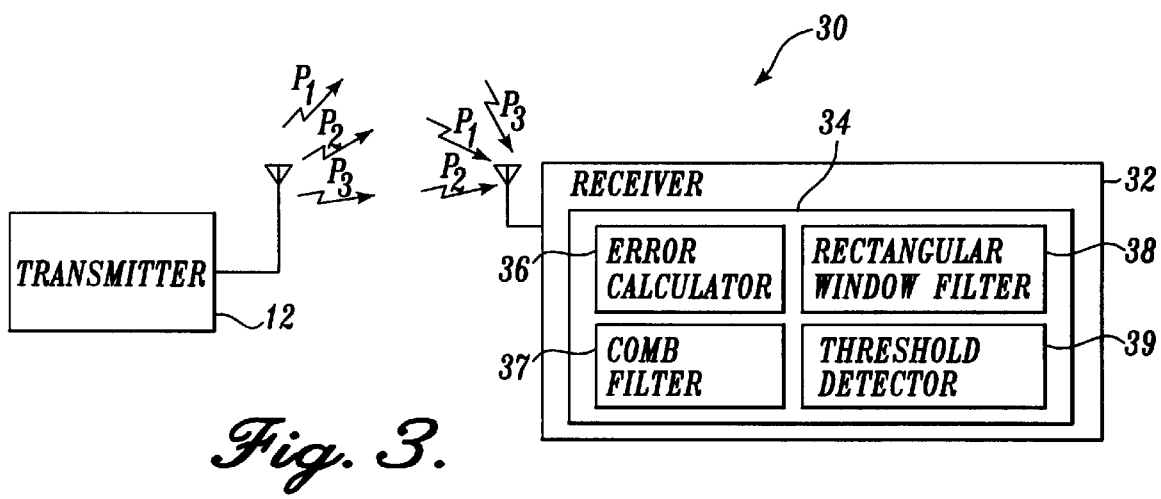
FIG. 3 is a block diagram illustrative of a communication system according to one embodiment of the present invention.

FIG. 3 is a block diagram illustrative of a communication system 30, according to one embodiment of the present invention. For clarity, like reference numbers are used between drawings to indicate elements having similar structure or function. System 30 includes conventional transmitter 12 and a receiver 32 according to the present invention. In addition to conventional "front end" circuitry (not shown) for sampling, demodulating, downconversion, etc., receiver 32 includes a protocol detector (PD) 34. In addition, PD 34 includes an error calculator (EC) 36, comb filter (CF) 37, rectangular window filter (RWF) 38, and threshold detector (TD) 39. EC 36, CF 37, RWF 38, and TD 39 are described in more detail below in conjunction with FIGS. 5–9.

As in a conventional system, receiver 32 includes a receiver "front end" (not shown) that processes the received signals and generates input samples $y_k$. The receiver front end processing typically includes demodulation, sampling, and pulse shaping. In accordance with the present invention, PD 34 determines the squared error (SE) between actual received signal samples and the estimated signal samples when known pilot symbols are transmitted. The estimated signal samples are computed using an estimated channel response. When the actual received signal samples are generated from transmitted pilot symbols, the squared error will be relatively low. Conversely, when the actual received signal samples are not generated from transmitted pilot symbols, the squared error will be relatively high. PD 34 uses the squared error between actual received signal samples and the estimated pilot symbol samples to detect a desired protocol as described below.

Figure 4:
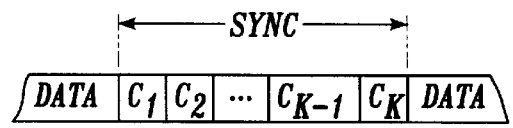
FIG. 4 is a diagram illustrative of a header synchronization sequence, according to one embodiment of the present invention.

FIG. 4 is a diagram illustrative of a header sync sequence of a protocol, according to one embodiment of the present invention. In accordance with the present invention, the header sync sequence consists of K pilot patterns. Each pilot pattern is a sequence of N symbols. In one embodiment, the header sync has fifty patterns of eighteen symbols per pilot pattern, each pilot pattern being defined according to definition (1) below:

$$c_n = \exp(j\pi/N \cdot \beta n^2) \quad (1)$$

where n indicates the position of the symbol (i.e., 0, 1, ..., N-1) in the symbol sequence of a given pilot pattern, and where β is a constant less than one (e.g., 0.9) to control the bandwidth of the pilot pattern. Pilot patterns according to definition (1) have the property that a frequency offset (e.g., caused by the Doppler effect and LO offsets in mobile wireless communication systems) causes only a relatively small time shift in the symbols of the error calculator's output. This pilot pattern is commonly referred to as a chirp with constant amplitude. Those skilled in the art will appreciate from definition (1) that the spectrum of the pilot pattern is relatively flat. This relatively flat spectrum over the frequency range of interest causes the estimation error (i.e., the squared error between a received signal sample and the estimated signal sample of a pilot symbol) to be relatively invariant with respect to frequency offset. Other sequences can be used in other embodiments, provided that the estimation error is also relatively invariant with respect to frequency offset. Thus, to indicate a transmission according to this protocol, the transmitter transmits such a header sequence.

Figure 5:
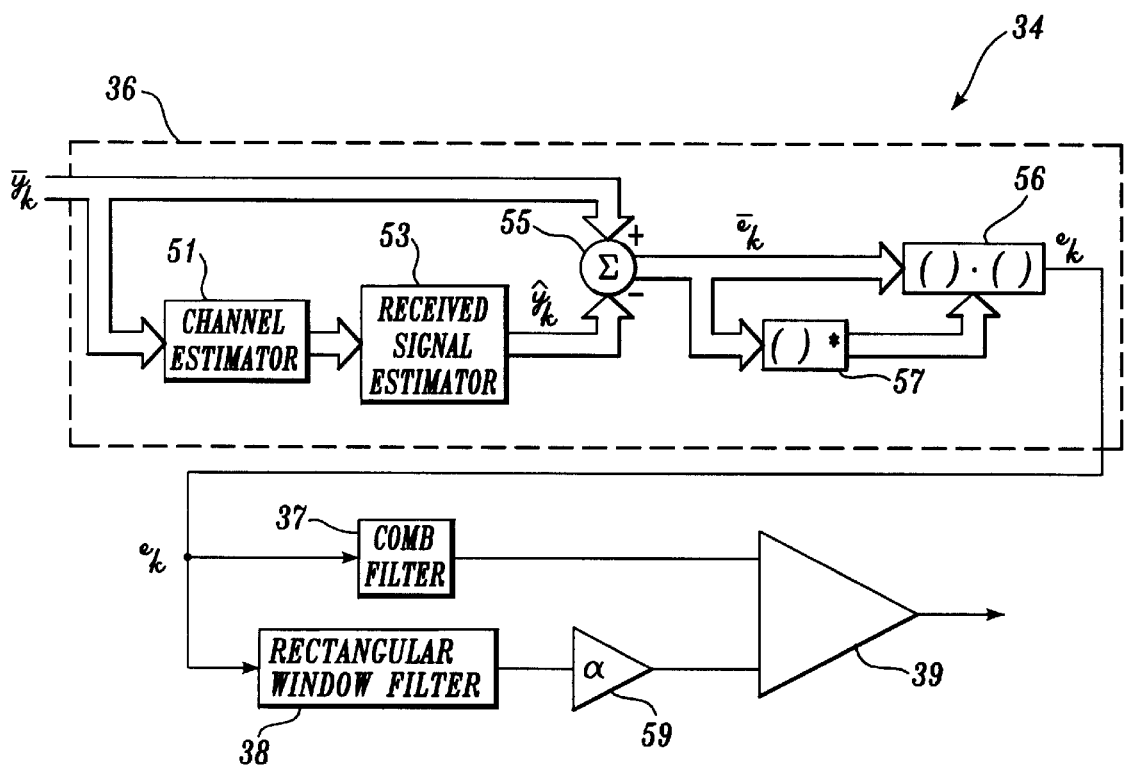
FIG. 5 is block diagram illustrative of a protocol detector, according to one embodiment of the present invention.

FIG. 5 is functional block diagram illustrative of PD 34, according to one embodiment of the present invention. In addition to EC 36, CF 37, RWF 38, and TD 39, this embodiment of PD 34 includes a channel estimator (CE) 51, a received signal estimator (RSE) 53, a summer 55, a multiplier 56, a conjugate transpose block (CTB) 57, and a scaler 59. In particular, CE 51, RSE 53, summer 55, multiplier 56, and CTB 57 form EC 36. In this embodiment, TD 39 is implemented with a comparator and asserts a signal when a header sync sequence is detected. CE 51 can be any suitable conventional channel estimator, but preferably, CE 51 is implemented as described in U.S. Pat. Ser. No. 09/086,974 entitled "Physical Channel Estimator", which is assigned to the same assignee and filed on May 28, 1998, as is the present application. In a preferred embodiment, PD 34 is implemented using a digital signal processor (DSP) under control of a program stored in a memory. A model 1620 DSP available from Lucent Technologies is used in this embodiment, although other embodiments may be implemented using any suitable DSP and associated memory.

PD 34 operates as follows. EC 36 receives samples $y_k$ and calculates the squared error between vector $\bar{y}_k$ (i.e., $[y_{k-M+1} \ldots y_k]$) and vector $\hat{y}_k$ (i.e., the estimated received samples when a pilot pattern is transmitted). To generate vector $\hat{y}_k$, first CE 51 estimates the impulse response of the channel, which is received by RSE 53. Using the channel estimates and the known characteristics of the pilot pattern, RSE 53 generates vector $\hat{y}_k$. Summer 55 then subtracts vector $\hat{y}_k$ from vector $\bar{y}_k$ to generate a vector $\bar{e}_k$. Using multiplier 56 and CTB 57, EC 36 outputs a scalar error $e_k$ sample by generating the dot product of vector $\bar{e}_k$ and the complex conjugate of vector $\bar{e}_k$. For example, when CE 37 is implemented as disclosed in the aforementioned "Physical Channel Estimator" application, the squared error between vector $\bar{y}_k$ and vector yk may be computed from definition (2) below:

$$e_k = (\bar{y}_k - U \cdot \hat{h}_k)^* \cdot (\bar{y}_k - U \cdot \hat{h}_k) \quad (2)$$

where $e_k$ represents the squared error between vectors $\bar{y}_k$ and $\hat{y}_k$, $\hat{h}_k$ represents the estimated channel response, and U represents a matrix of the estimated output samples from filtering the known pilot pattern samples through pulse shaping filters in the transmitter and receiver. More specifically the columns of matrix U are shifted versions of the signal generated according to definition (3) below:

$$u_i = C_n * P_t * P_r \quad (3)$$

where Cn is according to definition (1), indicates the convolution operation, and $P_t$ and $P_r$ are the impulse responses of the transmitter and receiver pulse shaping filters. The generation of matrix U and these refinements are disclosed in more detail in the aforementioned "Physical Channel Estimator" application.

As disclosed in the "Physical Channel Estimator" application, matrix U can be precomputed using the known characteristics of the pilot pattern signals and the pulse shaping filters. The channel response that is estimated from $\bar{y}_k$ can be represented according to definition (4) below for a selected set of C.

$$\hat{h}_k = (U=U)^{-1} U^* \bar{y}_k \quad (4)$$

where U=represents the conjugate transpose of matrix U. Thus, the term $U \cdot \hat{h}_k$ in definition (2) is, in general, different for each vector $\bar{y}_k$. Matrix U is generally fixed once computed by CE 51 for a particular set of $C_n$ of the sampled pilot pattern.

In accordance with the present invention, twelve pilot symbols of the eighteen symbols of a pilot pattern according to definition (1) above are preselected to generate matrix U. As described for one embodiment in the "Physical Channel Estimator" application, each of the twelve pilot symbols is sampled twice, and each column of matrix U contains twenty samples. Thus, in this embodiment, $\bar{y}_k$ is a vector of twenty samples.

When $\bar{y}_k$ is "aligned" with the samples used to form matrix U, the squared error sample $e_k$ is significantly reduced (ideally, to the level of the noise in the received signal). In this context, $\bar{y}_k$ is "aligned" when the samples forming $\bar{y}_k$ are generated from the symbols of a pilot pattern that correspond to the pilot symbol samples used to form matrix U. From the foregoing discussion, it will be appreciated that $\bar{y}_k$ is aligned only when pilot pattern symbols are being received and only once per pilot pattern. In contrast, when Yk is not aligned, the squared error sample $e_k$ is relatively high. Further, because "chirp-like" pilot patterns are used, any frequency offset incurred due to Doppler and LO offsets translates into only a slight time offset. The frequency offsets and corresponding time offsets expected for this embodiment (i.e., frequency offsets on the order of 3000 Hz) do not affect the detection process.

Figure 6:
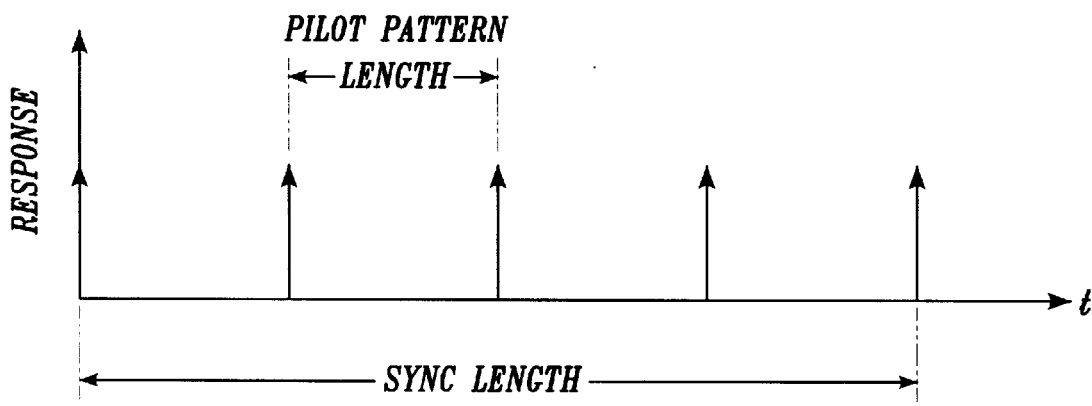
FIG. 6 is a diagram illustrative of the response of a comb filter used in the protocol detector of FIG. 5, according to one embodiment of the present invention.

The squared error sample $e_k$ determined by EC 36 is received by CF 37 and RWF 38. The impulse response of CF 37 is illustrated in FIG. 6. Ideally, the impulse response of CF 37 is a scaled impulse train having a total response length equal to the number of samples in the header sync sequence, with a period between impulses equal to the pilot pattern length. CF 37 in effect functions as an averager that generates a mean squared error (USE) for each sample position within a pilot pattern. As described above, if a pilot pattern is not being received or if the sample position is not aligned with matrix U, the current squared error sample $e_k$ from EC 36 will be relatively high. Assuming that PD 34 has been processing nonpilot pattern symbols for a relatively long time (e.g., a block of data according to another protocol, or a frame of normal data), the MSE for that sample position is at a relatively high value. Thus, the output sample of CF 37 stays about the same. However, if a pilot pattern is being sampled and the sample position is aligned with matrix U, the current squared error sample from EC 36 will be relatively low. Thus, the resulting output sample from CF 37 will tend to decrease.

Figure 8:
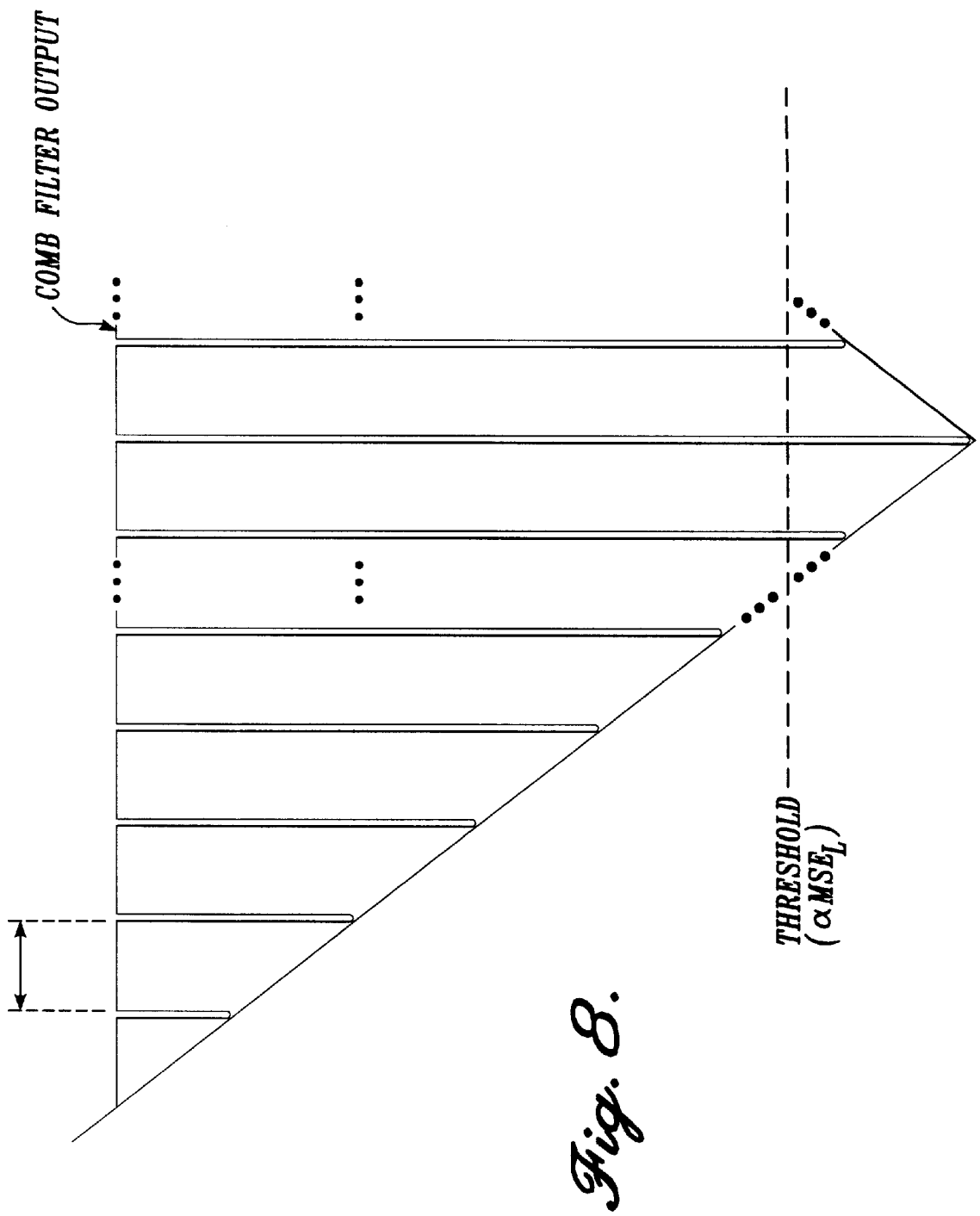
FIG. 8 is a diagram illustrative of the output sequence of the comb filter used in the protocol detector of FIG. 5.

As a header sync sequence is being processed, for the aligned sample position, the output samples from CF 37 will decrease, with a minimum value when the entire header sync sequence has been processed. The output samples of CF 37 will then begin to increase as the new high squared error samples from EC 36 are filtered through CF 37. This change in MSE for the aligned sample position is illustrated in FIG. 8.

Figure 7:
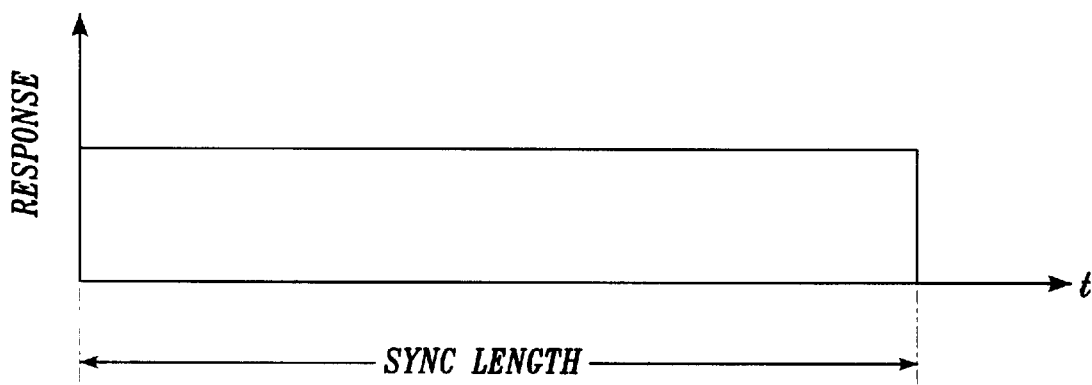
FIG. 7 is a diagram illustrative of the response of an average error calculation filter, according to one embodiment of the present invention.

RWF 38 in effect functions as an averager that generates the MSE for a sequence of the last L squared error samples generated by EC 36, where L represents the length of the header sync sequence. FIG. 7 illustrates the impulse response of RWF 38. Basically, the impulse response of RWF 38 is a scaled rectangular window having a length equal to the number of sample positions in a header sync sequence.

In one embodiment, a circular buffer is used to implement RWF 38 and CF 37. The circular buffer stores a number of past squared errors corresponding to the length of the header sync sequence. The sum of the values stored in the circular buffer, divided by the length of the circular buffer, represents the MSE outputted by RWF 38. A buffer having a length equal to the number of sample positions in a pilot pattern is used in conjunction with the circular buffer to implement CF 37. Each position of the buffer stores the sum of the squared errors corresponding to a sample position. The sum stored in each position of the buffer divided by the number of times a sample position occurs in a header sync sequence represents the MSE for that sample position outputted by CF 37.

Scaler 59 scales the MSE sequence generated by RWF 38 by a coefficient α. Generally, α is a positive value less than one and corresponds to a preselected threshold of the MSE of the header sync pattern. In one embodiment, the scaling coefficient is 0.6.

Comparator 39 then compares the MSE for each sample position (i.e., from CF 37) with the scaled MSE for the header sync sequence from scaler 59. If the output sample of CF 37 is less than the output sample of scaler 59, as illustrated by the dashed line threshold in FIG. 8, comparator 39 generates an indication that the header sync pattern has been detected. Thus, in this embodiment, if the MSE over a header sync length corresponding to a particular sample position is less than 60% of the MSE over the entire header sync length, then a header sync sequence is deemed detected.

In a further refinement, PD 34 may be configured to detect the minimum of the output samples of CF 37. This minimum should correspond to the sample position of the last pilot pattern of the header sync sequence. Thus, this minimum can be used in synchronizing receiver 30 (FIG. 3) to the header sync sequence.

Figure 9:
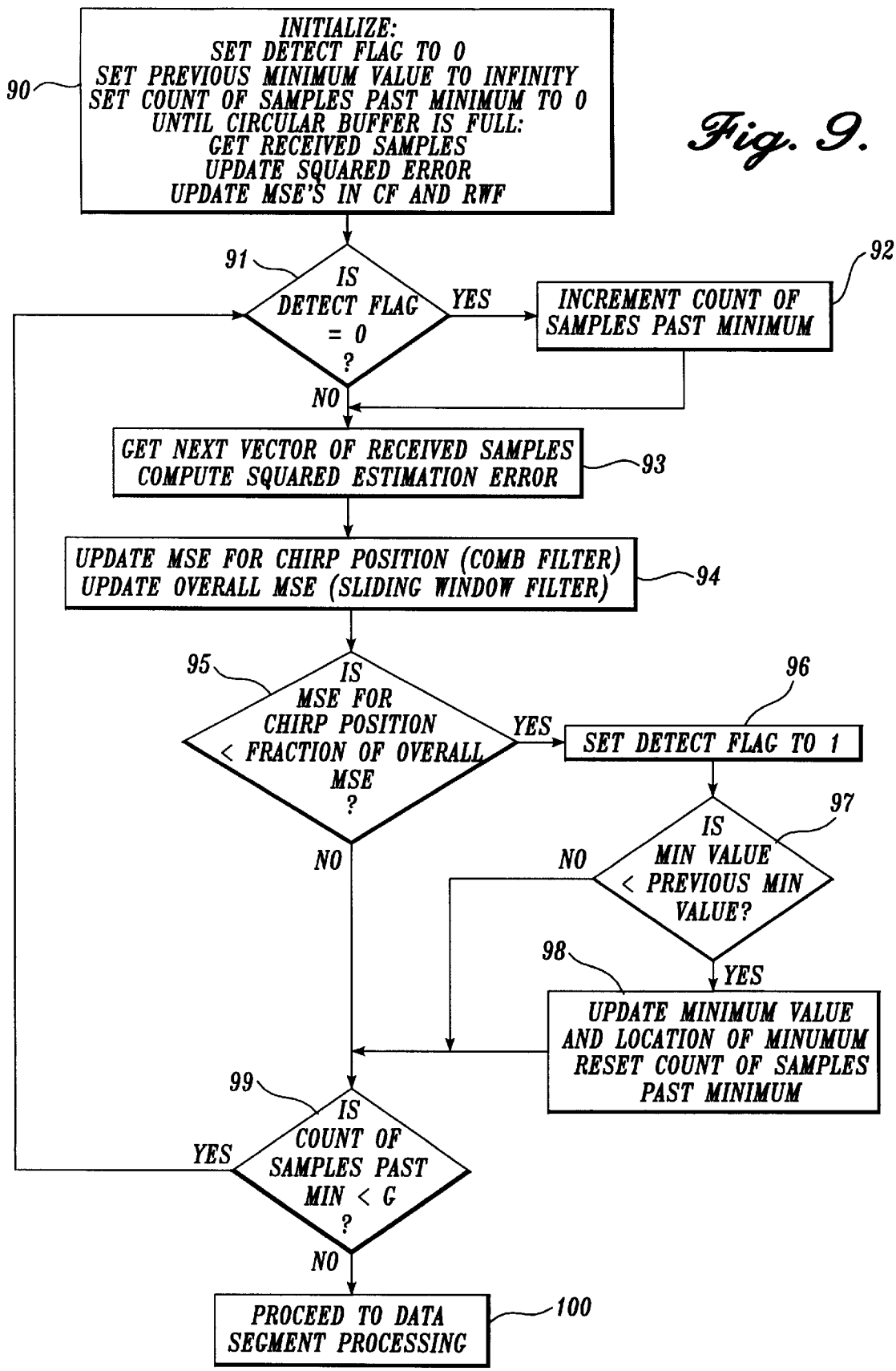
FIG. 9 is a flow diagram illustrative of the operation of protocol detector of FIG. 5, according to one embodiment of the present invention.

FIG. 9 is a flow diagram illustrative of the operation of PD 34 (FIG. 5), according to one embodiment of the present invention. This embodiment is implemented using a DSP. Referring to FIGS. 5 and 9, PD 34 operates as follows. As previously described in conjunction with FIG. 3, transmitter 12 is configured to transmit a header sync sequence according to definition (1) at the start of a transmission to receiver 30. In receiver 30, PD 34 is configured with a circular buffer to implement RWF 38 and CF 37. In a preferred embodiment, the length of the circular buffer is determined according to definition (5) below: (2NK) (5) where P represents the length in sample positions of the circular buffer, N represents the number of symbols in a pilot sequence, K represents the number of pilot sequences in a header sync sequence, and S represents the number of samples to be advanced between adjacent bins in the circular buffer. A factor of two is inserted in definition (5) because the receiver front end (not shown) samples each symbol twice in this embodiment. Those skilled in the art of digital signal processing will appreciate that a different factor could be used for different symbol sampling rates. The factor S is used to reduce the processing load on the DSP used to implement PD 34. Small values of S can be used without significantly affecting accuracy of the MSE generated by CF 37. In one embodiment, N, K, and S are equal to eighteen, fifty and three, respectively, resulting in P being equal to six hundred. In an embodiment in which CE 51 is implemented as disclosed in the aforementioned "Physical Channel Estimator" application, the U and R matrices are precomputed and stored in PD 34.

PD 34 is also configured with a buffer of sums to implement CF 37. Because only every third (i.e., S =3) symbol sample is used and there are thirty-six samples per pilot pattern (i.e., two samples per symbol with eighteen symbols per pilot sequence), the buffer of sums for CF 37 has twelve bins or sample positions. The CF buffer of sums is configured to store the MSE of the last K squared error samples for that particular sample position. Thus, for each sample position, CF 37 generates the MSE 20 of the last K squared error samples for a particular sample position by retrieving the value stored in the corresponding sample position of the CF buffer of sums.

In operation, PD 34 is first initialized in a step 90. This initialization process includes: (a) setting a detect flag to zero (indicating whether the current MSE value from CF 37 is below the threshold of TD 39, thereby indicating whether a header sync 25 sequence has been detected); (b) resetting to zero a counter that counts the number of times a sample position has been processed after the sample with the minimum MSE value has been processed; and (c) setting a variable PMV representing the previous minimum value to a preselected high value (i.e., well above the expected highest MSE generated by CF 37. For example, in one embodiment, PMV is initialized to the 30 maximum value that the DSP can recognize). In addition, the initialize process includes getting received samples, computing the squared estimation error, and updating the MSEs until the circular buffer is full.

In a next step 91, PD 34 checks whether the detect flag is set to one. If yes (thereby indicating that a header sync sequence has been detected), then PD 34 increments the counter in a step 92. In a next step 93, PD 34 increments index k by S and retrieves a next vector $\overline{y}_k$. As described above, each sample position increases in increments of S (i.e., three, in this embodiment) samples. EC 36 then generates the squared error sample $e_k$ corresponding to $\overline{y}_k$, according to definition (2). Referring back to step 91, if the detect flag is not set to one, the process proceeds directly to step 93.

In a next step 94, the squared error sample $e_k$ generated in step 93 is used to update the corresponding sample position of the CF buffer of sums implementing CF 37. In particular, the value of the oldest squared error sample in the circular buffer is subtracted from the current sample position in the CF buffer of sums, and the value of the current squared error sample $e_k$ is added to the sample position of the CF buffer of sums. The resulting sum is then divided by K (i.e., fifty in this embodiment) to generate the current MSE for the sample position. Alternatively, each squared error value generated by EC 36 can first be divided by K before being added to a sample position of the CF buffer of sums.

In addition, the squared error sample $e_k$ is used to update the overall MSE generated by RWF 38. In particular, the value of the oldest squared error sample in the circular buffer is subtracted and the value of squared error sample ek is added. The resulting sum is then divided by P to generate the MSE of the last P squared error samples generated by EC 36.

In a next step 95, TD 39 determines whether the MSE for the current sample position is less than the predetermined threshold. In this embodiment, the predetermined threshold is generated by scaling the current MSE outputted by RWF 38 by α(i.e., 0.6 in a preferred embodiment), via scaler 59. Thus, in this embodiment, the threshold level represents a percentage of the MSE of the last P squared errors. Other embodiments may use a different scheme for setting the threshold value (e.g., a fixed preselected threshold).

If the MSE for the current sample position is greater than or equal to the threshold, the process proceeds to a step 99 described below. Conversely, if the MSE for the current sample position is less than the threshold, the process performs a step 96 in which the detect flag is set to one. In a next step 97, PD 34 compares the current value of variable PMV to the MSE for sample position k. If the MSE for sample position k is greater than the current value of variable PMV, the process proceeds to step 99 (described below). However, if the MSE for the current sample position is less than the current value of variable PMV, the current value of PMV is replaced with the value of the MSE of the current sample position. In addition, the counter is reset to zero.

In step 99, the value of the counter is compared to a preselected constant integer G. In this embodiment, G is set to 120. This step helps ensure that PD 36 accurately detects a minimum MSE for the sample position, given that the MSE for a particular sample position is updated only once per pilot pattern, and that the MSE is affected by noise and fading. If the value of the counter is less than G, the minimum MSE is not yet deemed detected and, thus, the process returns to step 91. However, if the value of the counter is greater than or equal to G, in a step 100 then the minimum MSE is deemed detected and the start of the header sync segment is determined for synchronization purposes. More specifically, because the minimum MSE will occur in response to the last pilot sequence of the header sync sequence, the approximate start of the header sync sequence corresponds to the sample position of the Kth previous pilot sequence. Frequency offsets up to about 3000 Hz (e.g., from Doppler and/or LO frequency offsets) may shift the "minimum" sample position, but this does not affect the detection of the header sync sequence. The process then proceeds to a data segment processor to process the data segment of the transmission.

The embodiments of the synchronization detector described above are illustrative of the principles of the present invention and are not intended to limit the invention to the particular embodiments described. For example, in light of the present disclosure, those skilled in the art can, without undue experimentation, devise implementations of the channel estimator, comb filter, rectangular window filter, and threshold detector other than the embodiments described herein. In addition, different DSPs or general-purpose processors may be used instead of the particular DSP described. Moreover, although protocol detector embodiments are described, other embodiments can be adapted to detect patterns other than protocol sequences. Accordingly, while the preferred embodiment of the invention has been illustrated and described, it will be appreciated that various changes can be made therein without departing from the spirit and scope of the invention.

We claim:

1. A method of detecting a predetermined pattern of known samples corresponding to a sequence of symbols transmitted by a transmitter to a receiver through a channel, the predetermined pattern being part of a stream of symbols transmitted by the transmitter, the predetermined pattern being formed from a series of repeated subpatterns, the method comprising:

receiving a sequence of received samples, the sequence of received samples corresponding to a section of the stream of symbols;

mapping samples of the sequence of received samples into a set of sample positions corresponding to sample positions of a subpattern;

estimating an impulse response of the channel, determining a vector of estimated samples as a function of the estimated impulse response;

generating, for each sample position of a subpattern, an error sample as a function of the vector of estimated samples and a vector of received samples, the vector of received samples being dependent on a received sample taken during the sample position;

averaging the values of a current error sample and the previous K-1 error samples corresponding to the sample position of the current error sample to form a corresponding first average for the sample position, K being an integer greater than one; and comparing the first average to a predetermined threshold value.

2. The method of claim 1 wherein K represents the number of subpatterns in the predetermined pattern.

3. The method of claim 2 wherein a comb filter is used to generate the first average corresponding to each sample position of a subpattern.

4. The method of claim 3 wherein a circular buffer and a buffer of sums are used to implement the comb filter.

5. The method of claim 1 further comprising averaging the values of the current error sample and the previous P-1 generated error samples, wherein P is an integer greater than two to form a second average.

6. The method of claim 5 wherein P represents the number of sample positions in a subpattern multiplied by the number of subpatterns in the predetermined pattern.

7. The method of claim 6 wherein the predetermined threshold value represents the second average scaled by a scaling factor between zero and one.

8. The method of claim 6 wherein a rectangular window filter is used to generate the second average.

9. The method of claim 8 wherein a circular buffer is used to implement the rectangular window filter.

10. The method of claim 1 wherein a sequence of received samples matching the predetermined pattern is detected when the first average corresponding to a sample position is less than the threshold value.

11. The method of claim 10 further comprising detecting when the first average for the particular sample position reaches a minimum value.

12. An apparatus for detecting a predetermined pattern of known samples corresponding to a sequence of symbols transmitted by a transmitter to a receiver through a channel, the predetermined pattern being part of a stream of symbols transmitted by the transmitter, the predetermined pattern being formed from a series of repeated subpatterns, the apparatus comprising:

means for receiving a sequence of received samples, the sequence of received samples corresponding to a section of the stream of symbols;

means for mapping samples of the sequence of received samples into a set of sample positions corresponding to sample positions of a subpattern;

means for estimating an impulse response of the channel;

means for determining a vector of estimated samples as a function of the estimated impulse response;

means for generating, for each sample position of a subpattern, an error sample as a function of the vector of estimated samples and a vector of received samples, the vector of received samples being dependent on a received sample taken during the sample position;

first means for averaging the values of a current error sample and the previous K-1 error samples corresponding to the sample position of the current error sample to form a corresponding first average for the sample position, K being an integer greater than one; and means for comparing the first average to a predetermined threshold value.

13. The apparatus of claim 12 wherein K represents the number of subpatterns in the predetermined pattern.

14. The apparatus of claim 13 wherein the first means for averaging comprises a comb filter.

15. The apparatus of claim 14 wherein a circular buffer and a buffer of sums are used to implement the comb filter.

16. The apparatus of claim 12 further comprising second means for averaging the values of the current error sample and the previous P-1 generated error samples, wherein P is an integer greater than two to form a second average.

17. The apparatus of claim 16 wherein P represents the number of sample positions in a subpattern multiplied by the number of subpatterns in the predetermined pattern.

18. The apparatus of claim 17 wherein the predetermined threshold value represents the second average scaled by a scaling factor between zero and one.

19. The apparatus of claim 17 wherein the second means for averaging comprises a rectangular window filter.

20. The apparatus of claim 19 wherein a circular buffer is used to implement the rectangular window filter.

21. The apparatus of claim 12 wherein a sequence of received samples matching the predetermined pattern is detected when the first average corresponding to a sample position is less than the threshold value.

22. The apparatus of claim 21 further comprising means for detecting when the first average for the particular sample position reaches a minimum value.

23. A pattern detector for detecting a predetermined pattern of known samples corresponding to a sequence of symbols transmitted by a transmitter to a receiver through a channel, the predetermined pattern being part of a stream of symbols transmitted by the transmitter, the predetermined pattern being formed from a series of repeated subpatterns, the pattern detector comprising:

an error calculator coupled to receive a sequence of received samples corresponding to a section of the stream of symbols, wherein the error calculator is configured to output a series of error samples corresponding to the difference between a vector of estimated samples and a vector of received samples, the vector of estimated samples being a function of an estimated impulse response of the channel and a known pilot pattern;

a first averager coupled to the error calculator, wherein the first averager is configured to:

map error samples of the series of error samples into a set of sample positions, the set of sample positions corresponding to sample positions of a subpattern; and average the values of a current error sample and the previous K-1 error samples corresponding to the sample position of the current error sample to form a corresponding first average for the sample position, K being an integer greater than one; and a threshold detector coupled to the first averager, wherein the threshold detector is configured to detect if the first average is less than a predetermined threshold value.

24. The pattern detector of claim 23 wherein K represents the number of subpatterns in the predetermined pattern.

25. The pattern detector of claim 24 wherein the first averager comprises a comb filter.

26. The pattern detector of claim 25 wherein a circular buffer and a buffer of sums are used to implement the comb filter.

27. The pattern detector of claim 23 further comprising a second averager coupled to the error calculator, wherein the second averager is configured to average the values of the current error sample and the previous P-1 generated error samples, wherein P is an integer greater than two to form a second average.

28. The pattern detector of claim 27 wherein P represents the number of sample positions in a subpattern multiplied by the number of subpatterns in the predetermined pattern.

29. The pattern detector of claim 27 further comprising a scaler coupled to the second averager and the threshold detector, wherein the scaler is configured to scale the second average by a scaling factor between zero and one, the predetermined threshold value corresponding to the scaled second average.

30. The pattern detector of claim 28 wherein the second averager comprises a rectangular window filter.

31. The pattern detector of claim 30 wherein a circular buffer is used to implement the rectangular window filter.

32. The pattern detector of claim 23 wherein a sequence of received samples matching the predetermined pattern is detected when the first average corresponding to a sample position is less than the predetermined threshold value.

33. The pattern detector of claim 32 further comprising minimum detector coupled to the first averager, wherein the minimum detector is configured to detect whether a current value of a first average for the particular sample position reaches a minimum value.

34. The pattern detector of claim 23 wherein the error calculator comprises:

a channel estimator coupled to receive the sequence of received samples corresponding to a section of the stream of symbols and generate a set of estimated values representing the impulse response of the channel; and a received sample estimator coupled to the channel estimator, wherein the received sample estimator is configured to generate a series of vectors of estimated samples as a function of the set of estimated values and the known pilot pattern.

35. The pattern detector of claim 34 wherein the error calculator firther comprises a squared error generator coupled to the received sample estimator, the squared error generator configured to:

determine the difference between a vector of estimated samples and a current vector of received samples;

determine a conjugate transpose of the difference; and multiply the difference and the conjugate transpose of the difference to form a current error sample.

* * * * *